(12) United States Patent
Lee

(10) Patent No.: US 11,562,520 B2
(45) Date of Patent: Jan. 24, 2023

(54) METHOD AND APPARATUS FOR CONTROLLING AVATARS BASED ON SOUND

(71) Applicant: LINE Plus Corporation, Seongnam-si (KR)

(72) Inventor: Yunji Lee, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 38 days.

(21) Appl. No.: 17/204,437

(22) Filed: Mar. 17, 2021

(65) Prior Publication Data

US 2021/0295578 A1    Sep. 23, 2021

(30) Foreign Application Priority Data

Mar. 18, 2020    (KR) .......................... 10-2020-0033408

(51) Int. Cl.
*G06T 13/20*    (2011.01)
*G06T 13/40*    (2011.01)
*G11B 27/036*    (2006.01)
*G10L 15/08*    (2006.01)
*G06T 13/80*    (2011.01)
*G06V 40/20*    (2022.01)

(52) U.S. Cl.
CPC ............ *G06T 13/205* (2013.01); *G06T 13/40* (2013.01); *G06T 13/80* (2013.01); *G06V 40/23* (2022.01); *G10L 15/08* (2013.01); *G11B 27/036* (2013.01); *G06T 2200/24* (2013.01)

(58) Field of Classification Search
CPC ....... G06T 13/205; G06T 13/40; G06T 13/80; G06T 2200/24; G06V 40/23; G06V 40/20; G10L 15/08; G10L 21/10; G10L 15/26; G10L 25/63; G10L 2021/105; G11B 27/036; G06F 3/165; G06F 3/011; G06F 3/167
See application file for complete search history.

(56) References Cited

U.S. PATENT DOCUMENTS

| | | | |
|---|---|---|---|
| 7,027,054 B1 * | 4/2006 | Cheiky | H04N 5/262 345/473 |
| 10,521,946 B1 * | 12/2019 | Roche | G06T 13/40 |
| 10,586,369 B1 * | 3/2020 | Roche | G10L 13/00 |
| 10,732,708 B1 * | 8/2020 | Roche | G10L 15/22 |
| 10,770,092 B1 * | 9/2020 | Adams | G10L 21/10 |
| 2005/0057570 A1 * | 3/2005 | Cosatto | G06T 13/40 704/E21.02 |
| 2006/0009978 A1 * | 1/2006 | Ma | G10L 21/10 704/E21.02 |
| 2007/0153125 A1 * | 7/2007 | Cooper | G06V 40/20 375/E7.271 |
| 2008/0111887 A1 * | 5/2008 | Cooper | 704/E21.02 |
| 2009/0278851 A1 * | 11/2009 | Ach | G06T 13/40 345/473 |
| 2010/0007665 A1 * | 1/2010 | Smith | G06T 13/40 345/473 |

(Continued)

*Primary Examiner* — David T Welch
(74) *Attorney, Agent, or Firm* — Harness, Dickey & Pierce, P.L.C.

(57) ABSTRACT

Provided is a method for controlling avatar motion, which is operated in a user terminal and includes receiving an input audio by an audio sensor, and controlling, by one and more processors, a motion of a first user avatar based on the input audio.

18 Claims, 10 Drawing Sheets

(56) References Cited

U.S. PATENT DOCUMENTS

| | | | |
|---|---|---|---|
| 2013/0141643 A1* | 6/2013 | Carson | H04N 21/43072 |
| | | | 348/515 |
| 2015/0199978 A1* | 7/2015 | McCoy | G10L 21/10 |
| | | | 704/270 |
| 2017/0011745 A1* | 1/2017 | Navaratnam | B25J 11/001 |
| 2017/0154457 A1* | 6/2017 | Theobald | G06T 13/80 |
| 2017/0243387 A1* | 8/2017 | Li | G06V 20/46 |
| 2018/0214777 A1* | 8/2018 | Hingorani | A63F 13/5255 |
| 2021/0104236 A1* | 4/2021 | Doggett | G10L 15/1822 |

* cited by examiner

METHOD AND APPARATUS FOR CONTROLLING AVATARS BASED ON SOUND

CROSS-REFERENCE TO RELATED APPLICATION

This application claims priority under 35 U.S.C § 119 to Korean Patent Application No. 10-2020-0033408, filed in the Korean Intellectual Property Office on Mar. 18, 2020, the entire contents of which are hereby incorporated by reference.

BACKGROUND

Field

The present disclosure relates to methods and/or apparatuses for controlling an avatar motion, and more particularly, relates to methods and/or apparatuses for controlling an avatar motion, based on sound.

Description of the Related Art

There is a widespread distribution of camera-attached terminals, such as smartphones, tablet PCs, laptop computers, desktop computers, and the like. In this environment, growing numbers of users utilize cameras attached to terminals. As a representative example, services that use the camera attached to the terminal to use an avatar (e.g., a character representing a user's role in a virtual space) are provided.

For avatars that represent users, various technologies are provided to control the avatars, but there is an inconvenience that the user should manually manipulate the avatars. In particular, it is not easy to control the motion of the avatar naturally as the user encounters constantly changing situations.

SUMMARY

The present disclosure provides methods, non-transitory computer-readable recording mediums storing instructions, and apparatuses for controlling avatar motion based on sound.

Methods and apparatuses for controlling avatar motion based on sound and being capable of automatically controlling a motion of a user avatar by controlling body motion, lip motion, and/or facial expression of the user avatar are provided.

The present disclosure may be implemented in a variety of ways, including methods, apparatuses, or non-transitory computer-readable storage mediums storing instructions.

A method for controlling avatar motion according to an example embodiment includes receiving an input audio by an audio sensor, and controlling, by one and more processors, a motion of a first user avatar based on the input audio.

According to an example embodiment, the controlling a motion of a first user avatar may include detecting a text string from the input audio through speech recognition, and the controlling the body motion of the first user avatar based on the detected text string.

According to an example embodiment, the controlling a body motion of the first user avatar may include searching for an avatar motion associated with the detected text string based on a similarity score between the detected text string and registered instructions by using a mapping table in which the registered instructions and avatar motions are mapped to each other, and controlling the body motion of the first user avatar based on the searched avatar motion.

According to an example embodiment, the controlling a body motion of the first user avatar may include: detecting a first avatar motion and a second avatar motion from the detected text string by using a mapping table in which instructions and avatar motions are mapped to each other, and in response to determining that the first avatar motion and the second avatar motion are applicable in an overlapping manner, applying the first avatar motion and the second avatar motion to the first user avatar in the overlapping manner.

According to an example embodiment, the controlling body motion of the first user avatar may include detecting a first avatar motion and a second avatar motion from the detected text string by using a mapping table in which instructions and avatar motions are mapped to each other, and in response to determining that the first avatar motion and the second avatar motion are not applicable in an overlapping manner, delaying a timing of applying the second avatar motion such that the second avatar motion is applied to the first user avatar after application of the first avatar motion is finished.

According to an example embodiment, the controlling a body motion of the first user avatar may include detecting a first avatar motion and a second avatar motion from the detected text string by using a mapping table in which instructions and avatar motions are mapped to each other, and in response to determining that the first avatar motion and the second avatar motion are not applicable in an overlapping manner, shortening a playback time of the first avatar motion.

According to an example embodiment, the controlling a motion of a first user avatar may further include controlling a lip motion of the first user avatar based on the detected text string.

According to an example embodiment, the controlling a motion of a first user avatar may further include controlling a facial expression of the first user avatar based on a speech tone detected from the input audio.

According to an example embodiment, the controlling a motion of a first user avatar may include controlling a body motion of the first user avatar based on at least one of a tempo or a melody code of music detected from the input audio.

According to an example embodiment, the controlling a body motion of the first user avatar may include searching for an avatar motion associated with the detected melody code by using a mapping table in which melody codes and avatar motions are mapped to each other, determining a playback speed of the searched avatar motion based on the detected tempo of the music, and applying the searched avatar motion to the first user avatar.

According to an example embodiment, the controlling a motion of a first user avatar may further include detecting a text string from the input audio through speech recognition, and controlling a shape of a mouth of the first user avatar based on the detected text string.

According to an example embodiment, a method for controlling avatar motion may further include displaying a second user avatar associated with another user terminal and the first user avatar together on a screen, a motion of the second user avatar may be controlled based on another input audio received by the another user terminal.

According to an example embodiment, the controlling a motion of a first user avatar may include detecting a text string from the input audio through speech recognition, searching for an avatar motion from the detected text string by using a mapping table in which instructions and avatar motions are mapped to each other, and in response to the searched avatar motion being determined as a group motion, applying the searched avatar motion to the first user avatar and the second user avatar.

According to an example embodiment, the method for controlling avatar motion may further include searching for another user terminal in a vicinity of a first user terminal of the first user through short-range communication, transmitting a request to participate in an event to the another user terminal, and in response to the another user terminal accepting the request to participate in the event, displaying the first user avatar and a second user avatar associated with the another user terminal together on a screen of the first user terminal.

According to an example embodiment, the method for controlling avatar motion may further include receiving an input video by an image sensor, and displaying the first user avatar and the second user avatar on the input video.

According to an example embodiment, the method for controlling avatar motion may further include controlling the first motion of the first user avatar and a motion of the second user avatar together based on the input audio received by the audio sensor.

According to an example embodiment, the method for controlling avatar motion may further include controlling a motion of the second user avatar based on the input audio received by the another user terminal.

According to an example embodiment, the controlling a motion of a first user avatar may further include analyzing the input audio to recognize a song, and applying a choreography associated with the recognized song to the first user avatar.

There is provided a non-transitory computer-readable recording medium storing instructions for execution by one or more processors that, when executed by the one or more processors, cause a computer including the one or more processors to perform the method for controlling avatar motion described above, according to an example embodiment.

An apparatus for controlling avatar motion according to an example embodiment may include a memory, and one or more processors connected to the memory and configured to execute the computer-readable instructions contained in the memory such that the one or more processors are configured to cause the apparatus to receive an input audio from the audio sensor and control the motion of the first user avatar based on the input audio.

BRIEF DESCRIPTION OF THE DRAWINGS

Example embodiments of the present disclosure will be described with reference to the accompanying drawings described below, where similar reference numerals indicate similar elements, but are not limited thereto, in which.

DETAILED DESCRIPTION

Figure 1:
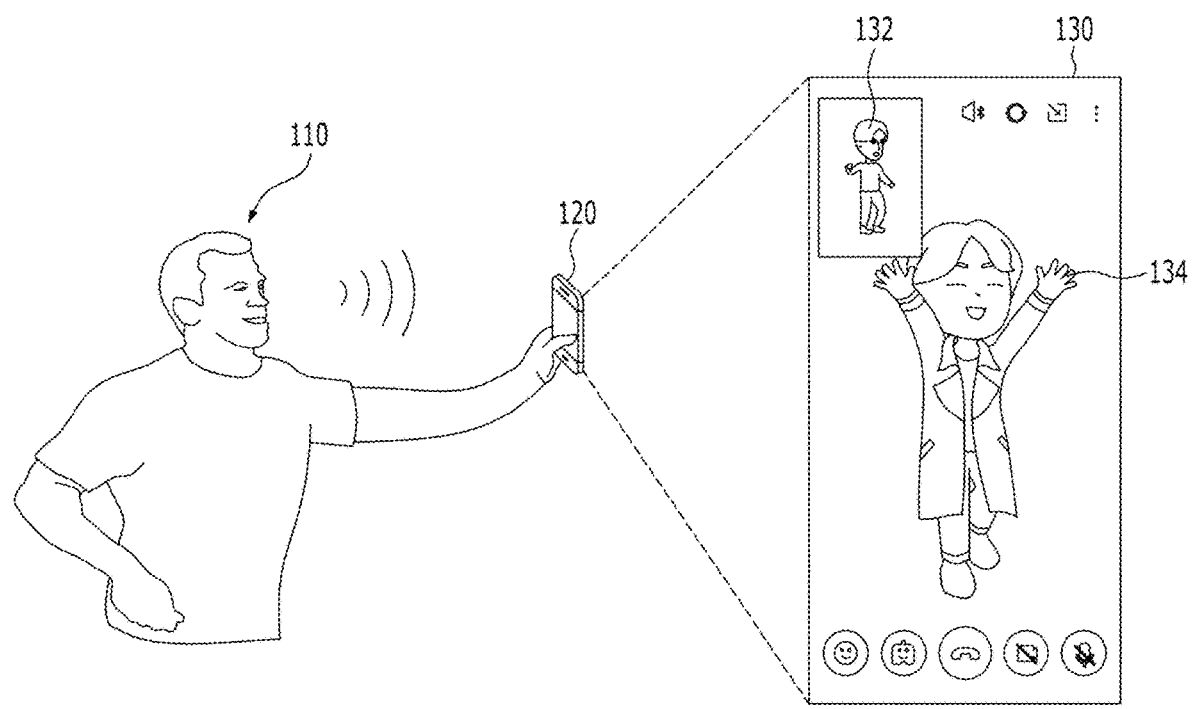
FIG. 1 is a diagram illustrating an example of a sound-based avatar motion control operating in a user terminal according to an example embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. In addition, in the following description of the example embodiments, duplicate descriptions of the same or corresponding components may be omitted. However, even if descriptions of components are omitted, it is not intended that such components are not included in any example embodiment.

Advantages and features of example embodiments and methods of accomplishing the same will be apparent by referring to the example embodiments described below in connection with the accompanying drawings. However, the present disclosure is not limited to the example embodiments disclosed below, and may be implemented in various different forms, and the present embodiments are merely provided to make the present disclosure complete, and to fully disclose the scope of the present disclosure to those skilled in the art to which the present disclosure pertains.

The terms used herein will be briefly described prior to describing the disclosed example embodiments in detail. The terms used herein have been selected as general terms, which are widely used at present in consideration of the functions of the present disclosure, and this may be altered according to the intent of an operator skilled in the art, conventional practice, or introduction of new technology. In addition, in a specific case, a term may be arbitrarily selected, and the meaning of the term will be described in detail in a corresponding description of the example embodiments. Therefore, the terms used in the present disclosure should be defined based on the meaning of the terms and the overall contents of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to hardware or a combination of software and hardware, and "module" or "unit' performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an example embodiment of the present disclosure, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory that is integral to a processor is in electronic communication with the processor.

In the present disclosure, the "music" may refer to any sound that includes melody, such as humming, tune, song, and so on.

In the present disclosure, the "body motion" may refer to a motion that can be expressed through body parts (head, arms, legs, torso, joints) other than facial expressions and lip expression of a user avatar.

In the present disclosure, the "screen" may include at least one image or video continuous in time, and further, may include audio.

As used herein, the "user account" may represent an account generated and used by a user in the instant messaging application or data related thereto. In addition, the user account of the instant messaging application may refer to a user who uses the instant messaging application. Likewise, a user who uses instant messaging or a chat room capable of instant messaging may refer to the user account of the instant application. Further, the user account may include one or more user accounts.

FIG. 1 is a diagram illustrating an example of a sound-based avatar motion control operating in a user terminal 120 according to an example embodiment. A user 110 may use the user terminal 120 to use a video call service with other users. According to an example embodiment, the user 110 may perform the video call using an avatar through an instant messaging application executed on the user terminal 120.

As illustrated, the user terminal 120 may display an avatar 134 of a counterpart user and an avatar 132 of the user 110 together on a video call screen 130. In an example embodiment, the avatar 134 of the counterpart user may be displayed in full screen on the video call screen 130, and the avatar 132 of the user 110 may be displayed on an upper left side of the video call screen 130. For example, the avatar 134 of the counterpart user may be displayed to be larger than the avatar 132 of the user 110.

In an example embodiment, a motion of the avatar 132 of the user 110 may be controlled based on the sound received by the user terminal 120. A motion of the avatar 134 of the counterpart user may be controlled based on the sound received by the counterpart user terminal (not illustrated). In some example embodiments, the motion of the avatar 132 of the user 110 and the motion of the avatar 134 of the counterpart user may be jointly controlled based on the sound received by one terminal (e.g., the user terminal 110 or the counterpart user terminal (not illustrated)).

In an example embodiment, the user terminal 120 may control at least one of a body motion or a lip motion of the user avatar based on a text string detected from an input audio through speech recognition. In some example embodiments, the user terminal 120 may control facial expressions (e.g., changes in eyebrows, eye size, nose, lips, and the like) of the avatar 132 based on a speech tone of the user 110 detected from the input audio. For example, when the user 110 says "Hooray" with an exciting voice, the user terminal 120 may control (e.g., lip sync) the lip motion of the avatar such that a shape of a mouth of the avatar 132 becomes a shape of a mouth for pronouncing "Hooray", and control the body motion of the avatar such that the avatar 132 takes a hooray pose, and control the facial expression of the avatar such that the avatar 132 makes an excited facial expression.

In an example embodiment, when a group motion instruction is detected in the text string detected from input audio through speech recognition, the user terminal 120 may apply a group motion associated with the instruction to the avatar 132 of the user 110 and the avatar 134 of the counterpart user. For example, when the user 110 says "high five" with an exciting voice, it may control the body motion of the avatar 132 of the user 110 and the avatar 134 of the counterpart user together such that the avatar 132 of the user 110 and the avatar 134 of the counterpart user perform a high-five motion together with each other. In addition, the user terminal 120 may control the lip motion of the avatars 132 and 134 such that the mouths of the avatars 132 and 134 are shaped to pronounce "high five", and control the facial expressions of the avatars 132 and 134 such that the avatars 132 and 134 make exciting facial expressions.

In an example embodiment, the user terminal 120 may control the body motion of the avatar 132 based on at least one of a tempo or a melody code of music detected from the input audio. In some example embodiments, the user terminal 120 may control the lip motion (e.g., lip sync) of the user avatar based on a text string (e.g., lyrics) detected through speech recognition. For example, the user terminal 120 may control the body motion of the avatar such that the avatar 132 performs an avatar motion (e.g., spin motion) associated with the detected melody code (e.g., C#), and control the lip motion of the avatar such that the shape of a mouth of the avatar 132 becomes a shape of a mouth for pronouncing the detected lyrics. In this case, a playback speed of the avatar motion applied to the avatar may be determined based on the detected tempo of music.

In an example embodiment, the user terminal 120 may recognize a song by analyzing the input audio, and apply a choreography associated with the recognized song to the avatar 132. In some example embodiments, the user terminal 120 may search for the lyrics of the recognized song and control the lip motion of the avatar such that the shape of a mouth of the avatar 132 becomes the shape of a mouth for pronouncing the searched lyrics. In some example embodiments, the user terminal 120 may detect lyrics from the input audio through speech recognition and control the lip motion of the avatar such that the shape of a mouth of the avatar 132 becomes the shape of a mouth for pronouncing the detected lyrics. In some example embodiments, the user terminal 120 may analyze the input audio to recognize a genre of the song (e.g., hip-hop, R&B, and the like), and apply a choreography associated with the recognized genre of the song to the avatar.

The motion of the avatar 132 described above may be displayed on the video call screen 130. In addition, the motion of the avatar 132 may be transmitted to the terminal of the counterpart user together with the speech of the user 110 through the instant messaging application. In this case, the terminal of the counterpart user may display the received motion of the avatar 132 on the screen and output the speech of the user 110 through a speaker or the like.

As described above, with the video call service that uses avatars rather than video captured by the camera of the user terminal, the user is able to perform a video call without revealing the actual image of the user. Through these services, a new user experience can be provided to users. Further, by automatically controlling the avatar motion based on the sound, it is possible to provide the avatar motion reflecting the conversation and emotion of the user, and thus maximize the utilization of visual communication. Accordingly, the inconvenience of manually searching and selecting an avatar motion for the user can be eliminated.

It has been described above that the user terminal automatically controls the avatar motion based on the sound, but the present disclosure is not limited thereto. For example, the user terminal may recommend one or a plurality of avatar motions to the user based on sound. Further, it has been described above that the user terminal 120 controls/recommends the avatar motion, but the present disclosure is not limited thereto. For example, it is also possible that a server (e.g., an instant messaging server) performs the avatar motion control.

Figure 2:
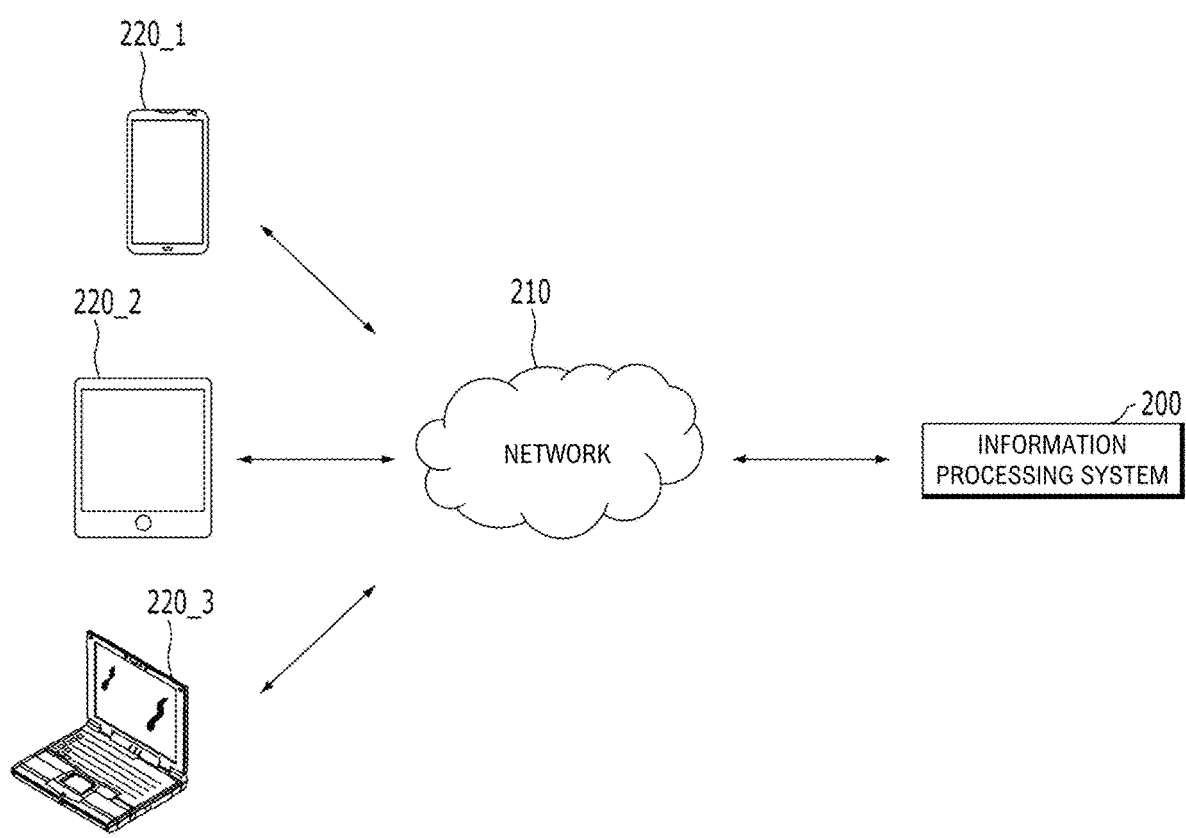
FIG. 2 is a schematic diagram illustrating a configuration in which an information processing system is communicatively connected to a plurality of user terminals in order to provide an avatar motion control service according to an example embodiment.

FIG. 2 is a schematic diagram illustrating a configuration in which an information processing system 200 is communicatively connected to a plurality of user terminals 220_1, 220_2, and 220_3 to provide an avatar motion control service according to an example embodiment. The information processing system 200 may include a system capable of providing an instant messaging service including an avatar motion control service to a plurality of user terminals 220_1, 220_2, and 220_3 through the network 210. According to an example embodiment, the information processing system 200 may include one or more server devices and/or databases, or one or more distributed computing devices and/or distributed databases based on cloud computing services that can store, provide and execute computer-executable programs (e.g., downloadable applications) and data related to the instant messaging service and the avatar motion control service. The instant messaging service provided by the information processing system 200 may be provided to the user through the instant messaging application installed in each of the plurality of user terminals 220_1, 220_2, and 220_3. For example, the instant messaging service may include a text messaging service, a video call service, a speech call service, a video streaming service, an avatar motion control service, a content evaluation service, and the like between users of the instant messaging application.

The plurality of user terminals 220_1, 220_2, and 220_3 may communicate with the information processing system 200 through the network 210. The network 210 may be configured to enable communication between the plurality of user terminals 220_1, 220_2, and 220_3 and the information processing system 200. The network 210 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication is not limited, and may include a communication method using a communication network (e.g., mobile communication network, wired Internet, wireless Internet, broadcasting network, satellite network, and the like) that may be included in the network 210 as well as short-range wireless communication between the user terminals 220_1, 220_2, and 220_3.

In FIG. 2, a mobile phone terminal 220_1, a tablet terminal 220_2, and a PC terminal 220_3 are illustrated as the examples of the user terminals, but are not limited thereto, and the user terminals 220_1, 220_2, and 220_3 may be any computing device that is capable of wired and/or wireless communication and that can be installed with the instant messaging application and execute the same. For example, the user terminal may include a smart phone, a mobile phone, a navigation system, a computer, a notebook computer, a digital broadcasting terminal, Personal Digital Assistants (PDA), a Portable Multimedia Player (PMP), a tablet PC, a game console, a wearable device, an internet of things (IoT) device, a virtual reality (VR) device, an augmented reality (AR) device, and the like. In addition, FIG. 2 shows that three user terminals 220_1, 220_2, and 220_3 are in communication with the information processing system 200 through the network 210, but the present disclosure is not limited thereto, and a different number of user terminals may be configured to be in communication with the information processing system 200 through the network 210.

In an example embodiment, the information processing system 200 may provide the avatar motion control service through the instant messaging application running on the user terminals 220_1, 220_2, and 220_3. When the user account associated with the user terminal does not have an avatar, the information processing system 200 may cause a new avatar to be generated, and store the user account and the generated avatar in association with each other. When the user account has a plurality of avatars, the information processing system 200 may provide the avatar motion control service by using a representative avatar of the user account. In some example embodiments, when the user account has a plurality of avatars, the information processing system 200 may request the user to select an avatar to be used for the avatar motion control service.

Figure 3:
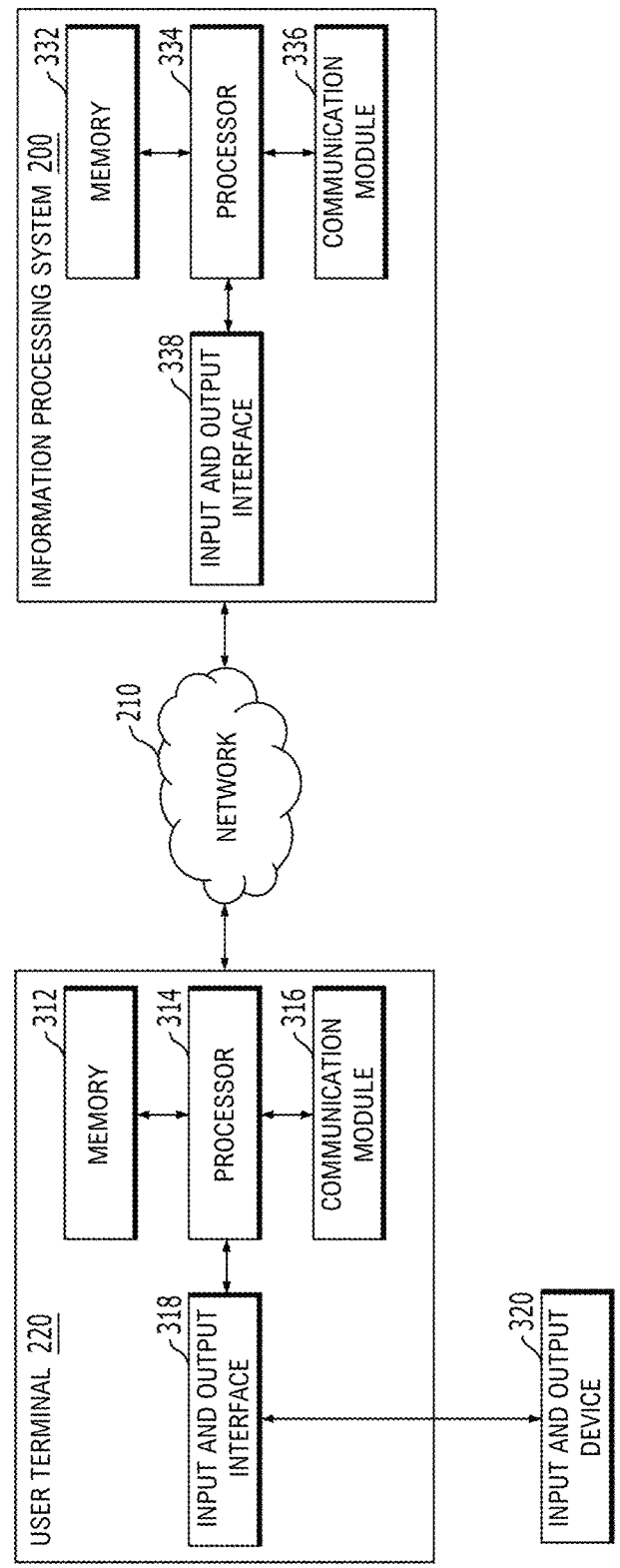
FIG. 3 is a block diagram illustrating an internal configuration of the user terminal and an information processing system according to an example embodiment.

FIG. 3 is a block diagram illustrating an internal configuration of the user terminal 220 and the information processing system 200 according to an example embodiment. The user terminal 220 may refer to any computing device that is capable of executing the instant messaging application and also capable of wired/wireless communication, and may include the mobile phone terminal 220_1, the tablet terminal 220_2, or the PC terminal 220_3 of FIG. 2, for example. As illustrated, the user terminal 220 may include a memory 312, a processor 314, a communication module 316, and an input and output interface 318. Likewise, the information processing system 200 may include a memory 332, a processor 334, a communication module 336, and an input and output interface 338. As shown in FIG. 3, the user terminal 220 and the information processing system 200 may be configured to communicate information and/or data through the network 210 using the respective communication modules 316 and 336. Further, the input and output device 320 may be configured to input information and/or data to the user terminal 220 or to output information and/or data generated from the user terminal 220 through the input and output interface 318.

The memories 312 and 332 may include any non-transitory computer-readable recording medium. According to an example embodiment, the memories 312 and 332 may include a permanent mass storage device such as random access memory (RAM), read only memory (ROM), disk drive, solid state drive (SSD), flash memory, and the like. As another example, a non-destructive mass storage device such as ROM, SSD, flash memory, disk drive, and the like may be included in the user terminal 220 or the information processing system 200 as a separate permanent storage device that is separate from the memory. Further, an operating system and at least one program code (e.g., a code for the instant messaging application, and the like installed and driven in the user terminal 220) may be stored in the memories 312 and 332.

These software components may be loaded from a computer-readable recording medium separate from the memories 312 and 332. Such a separate computer-readable recording medium may include a recording medium directly connectable to the user terminal 220 and the information processing system 200, and may include a computer-readable recording medium such as a floppy drive, a disk, a tape, a DVD/CD-ROM drive, a memory card, and the like, for example. As another example, the software components may be loaded into the memories 312 and 332 through the communication modules rather than the computer-readable recording medium. For example, at least one program may be loaded into the memories 312 and 332 based on a computer program (for example, an application that provides instant messaging application services) installed by files provided by the developers or a file distribution system for distributing an installation file of the application through the network 210.

The processors 314 and 334 may be configured to process instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to program code stored in a recording device such as the memories 312 and 332.

The communication modules 316 and 336 may provide a configuration or function for the user terminal 220 and the information processing system 200 to communicate with each other through the network 210, and may provide a configuration or function for the user terminal 220 and/or the information processing system 200 to communicate with another user terminal or another system (e.g., a separate cloud system). For example, a request or data (e.g., video calls using avatars) generated by the processor 314 of the user terminal 220 according to the program code stored in the recording device such as the memory 312 or the like may be transmitted to the information processing system 200 through the network 210 under the control of the communication module 316. Conversely, a control signal or instructions provided under the control of the processor 334 of the information processing system 200 may be received by the user terminal 220 through the communication module 316 of the user terminal 220 via the communication module 336 and the network 210. For example, the user terminal 220 may receive information on the avatar and information associated with motion control of the avatar from the information processing system 200 through the communication module 316.

The input and output interface 318 may be a means for interfacing with the input and output device 320. As an example, the input device may include a device such as a camera, a keyboard, a microphone, and a mouse, which includes an audio sensor and/or an image sensor, and the output device may include a device such as a display, a speaker, a haptic feedback device, and the like. As another example, the input and output interface 318 may be a means for interfacing with a device such as a touch screen or the like that integrates a configuration or function for performing inputting and outputting. For example, when the processor 314 of the user terminal 220 processes the instruction of the computer program loaded in the memory 312, a service screen or user avatar configured using the information and/or data provided by the information processing system 200 or other user terminals may be displayed on the display through the input and output interface 318. While FIG. 3 illustrates that the input and output device 320 is not included in the user terminal 220, example embodiments are not limited thereto, and the input and output device 320 may be configured as one device with the user terminal 220. Further, the input and output interface 338 of the information processing system 200 may be a means for interfacing with a device (not illustrated) for inputting or outputting, which may be connected to the information processing system 200 or included in the information processing system 200. In FIG. 3, the input and output interfaces 318 and 338 are illustrated as the components configured separately from the processors 314 and 334, but are not limited thereto, and the input and output interfaces 318 and 338 may be configured to be included in the processors 314 and 334.

The user terminal 220 and the information processing system 200 may include more components than the components illustrated in FIG. 3. Meanwhile, it would be unnecessary to exactly illustrate most of the related components. According to an example embodiment, the user terminal 220 may be implemented to include at least a part of the input and output devices 320 described above. Further, the user terminal 220 may further include other components such as a transceiver, a global positioning system (GPS) module, a camera, various sensors, a database, and the like. For example, when the user terminal 220 is a smartphone, it may generally include components included in the smartphone, and for example, it may be implemented such that various components such as an acceleration sensor, a gyro sensor, a camera module, various physical buttons, buttons using a touch panel, input and output ports, a vibrator for vibration, and the like are further included in the user terminal 220.

According to an example embodiment, the processor 314 of the user terminal 220 may be configured to operate the instant messaging application or web browser application providing the instant messaging service including the avatar motion control service. In this case, a program code associated with the application may be loaded into the memory 312 of the user terminal 220. While the application is running, the processor 314 of the user terminal 220 may receive information and/or data provided from the input and output device 320 through the input and output interface 318 or receive information and/or data from the information processing system 200 through the communication module 316, and process the received information and/or data and store it in the memory 312. Further, such information and/or data may be provided to the information processing system 200 through the communication module 316.

While the instant messaging application is running, the processor 314 may receive text, image, audio, and/or the like, which are input or selected through the input device such as a camera, a microphone, and the like including a touch screen, a keyboard, an audio sensor and/or an image sensor connected to the input and output interface 318, and store the received text, image, and/or audio or the like in the memory 312, or provide it to the information processing system 200 through the communication module 316 and the network 210. In an example embodiment, the processor 314 may provide the input audio received through the input device to the information processing system 200 through the network 210 and the communication module 316. In some example embodiments, after performing processing (e.g., speech recognition, speech tone analysis, melody code detection, music tempo detection, and/or song recognition) of the received input audio, the processor 314 may transmit the processed data (detected text string, information on analyzed speech tone, detected melody code, detected music tempo, information on recognized song, and/or data for avatar motion control,) to the information processing system 200.

The processor 334 of the information processing system 200 may be configured to manage, process, and/or store the information and/or data received from a plurality of user terminals and/or a plurality of external systems. In an example embodiment, the processor 334 may determine an avatar motion (e.g., avatar body motion, lip motion, and/or facial expression) to be applied to the user avatar based on the input audio received from the user terminal 220. The information and/or data associated with the motion of the user avatar determined by the processor 334 may be transmitted to the user terminal through the network 210 and the communication module 336. In another example embodiment, the processor 334 may transmit the data for avatar motion control received from the user terminal 220 to another user terminal.

The processor 314 may be configured to output the processed or received information and/or data from the information processing system 200 through an output device such as a device capable of outputting a display (e.g., a touch screen or a display) of the user terminal 220, a device capable of outputting an audio (e.g., a speaker), or the like. According to an example embodiment, the processor 314 may display the avatar motion on the display based on information and/or data associated with the received motion of the user avatar. In this case, sound related with the motion of the avatar may be output together through the speaker.

Figure 4:
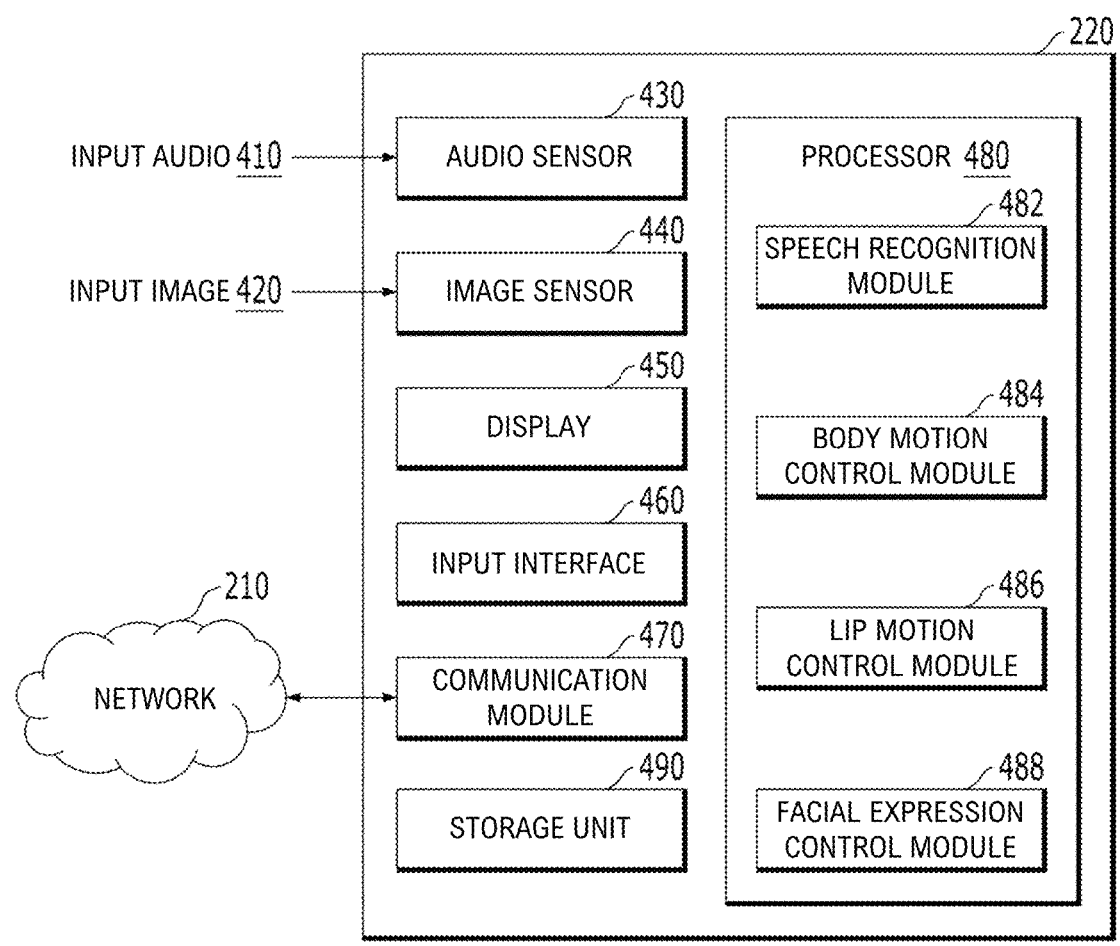
FIG. 4 is a block diagram illustrating a detailed configuration of the user terminal according to an example embodiment.

FIG. 4 is a block diagram illustrating a detailed configuration of the user terminal 220 according to an example embodiment. The user terminal 220 may be configured to include an audio sensor 430, an image sensor 440, a display 450, an input interface 460, a communication module 470, a processor 480, and a storage unit 490. As illustrated, the processor 480 may be configured to include a speech recognition module 482, a body motion control module 484, a lip motion control module 486, and a facial expression control module 488.

The audio sensor 430 may be configured to receive an input audio 410 continuously, periodically, or intermittently, and provide the received input audio 410 to the communication module 470, the processor 480, the storage unit 490, and the like. For example, the audio sensor 430 may receive a speech, song, and the like of the user as the input audio 410. The audio sensor 430 may also include one or more microphones or any other types of sound sensors that may be used to receive the input audio 410.

The image sensor 440 may be configured to receive an input image 420 including one or a plurality of images. For example, the image sensor 440 may be a camera module. The input image 420 received by the image sensor 440 may be provided to the display 450, the communication module 470, the processor 480, the storage unit 490, and the like.

The display 450 may be configured to output information and/or data generated by the user terminal 220. According to an example embodiment, the input image 420 received by the image sensor 440 may be displayed on the display 450. In addition to the display 450, devices such as a speaker, a haptic feedback device, and the like may be provided together with the display 450 as the output device.

The input interface 460 may be configured to allow the user to input information and/or data to the user terminal 220. For example, the input interface 460 may include devices such as a touch screen, a button, a keypad, a touch pad, a keyboard, a microphone, a mouse, and the like. In FIG. 4, the display 450 is illustrated as a separate component from the input interface 460, but is not limited thereto, and the display 450 and the input interface 460 may be provided as an integrated input and output device.

The user terminal 220 may be configured to communicate information and/or data with another device (e.g., a server or another user terminal) through the network 210 by using the communication module 470. The communication module 470 may be configured of a plurality of communication modules, and may include a long-distance communication module, a short-range communication module, and the like. FIG. 4 illustrates that the user terminal 220 communicates data with another device through the network 210, but the present disclosure is not limited thereto. For example, the user terminal 220 may directly communicate with another device by using a short-range communication module, or the like.

The speech recognition module 482 may perform speech recognition on the input audio 410 received from the audio sensor 430 and detect a text string from the input audio 410. According to an example embodiment, the speech recognition module 482 may be configured to sample the input audio 410 to determine whether or not a speech is detected, and when the speech of the user is detected, perform speech recognition. The speech recognition module 482 may provide the detected text string to the body motion control module 484, the lip motion control module 486, and the like.

The body motion control module 484 may be configured to control the body motion of the user avatar based on the text string detected from the speech recognition module 482. In an example embodiment, the body motion control module 484 may search for an avatar motion associated with the detected text string by using a mapping table in which instructions stored in the storage unit 490 and avatar motions are mapped. In this case, based on the determination of similarity between the detected text string and the instructions registered in the mapping table, an avatar motion associated with the detected text string may be searched. For example, when the detected text string is "depressed", the body motion control module 484 may compare the degree of similarity between "depressed" and the registered instructions, and determine that "depressed" has the highest similarity score, which is equal to or greater than a threshold value, with "sadness" among the registered instructions. In this case, the body motion control module 484 may control the body motion of the user avatar based on the avatar motion mapped with "sadness" in the mapping table.

In some example embodiments, when music is detected in the input audio 410, the body motion control module 484 may be configured to control the body motion of the user avatar based on at least one of a tempo or a melody code of the music. According to an example embodiment, the body motion control module 484 may search for an avatar motion associated with the detected melody code by using a mapping table in which a melody code and an avatar motion are mapped, and control the body motion of the user avatar to perform the searched avatar motion. In this case, a playback speed of the avatar motion applied to the avatar may be determined based on the detected tempo of music. For example, when the tempo of music is fast, the playback speed of the avatar motion may be adjusted to be fast, and when the tempo of the music is slow, the playback speed of the avatar motion may be adjusted to be slow.

In some example embodiments, the body motion control module 484 may be configured such that, when music is detected in the input audio 410, the body motion control module 484 may analyze the input audio 410 to recognize a song, and control a body motion of the user avatar based on a choreography associated with the recognized song. According to an example embodiment, the body motion control module 484 may search for a choreography associated with the recognized song by using a mapping table in which songs stored in the storage unit 490 and avatar choreographies are mapped, and apply the searched choreography to the user avatar.

The lip motion control module 486 may be configured to control the lip motion of the user avatar based on the detected text string. According to an example embodiment, the lip motion control module 486 may control (e.g., lip sync) the lip motion of the user avatar to become a shape of a mouth for pronouncing the detected text string. With such a configuration, it is possible to obtain an effect as if the avatar is speaking with the voice of the user, and thus the liveliness of the avatar service can be enhanced.

The facial expression control module 488 may be configured to control a facial expression of the user avatar based on a speech tone detected from the input audio 410. According to an example embodiment, the facial expression control module 488 may analyze an audio spectrum of the input audio 410 to detect a speech tone associated with the user's emotion. For example, by analyzing the audio spectrum, it is possible to detect the speech tones associated with user emotions such as "joy", "happiness", "depression", "sadness", and so on. The facial expression of the avatar may be controlled by changing the shape and size of the avatar's eyebrows, eyes, nose, lips, and the like.

Figure 5:
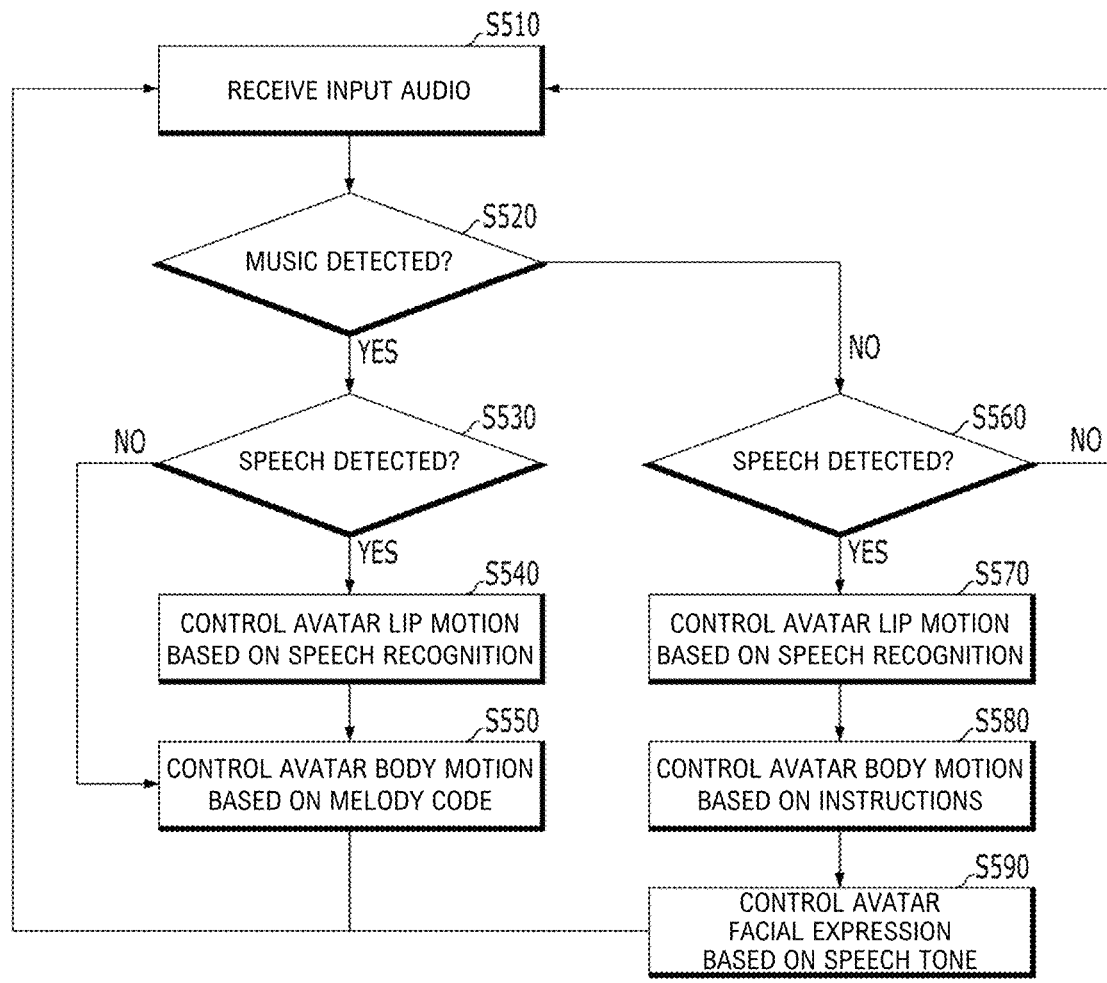
FIG. 5 is a flowchart illustrating a method for controlling a motion of an avatar according to an example embodiment.

FIG. 5 is a flowchart illustrating a method for controlling a motion of an avatar according to an example embodiment. The method for controlling the avatar motion may be performed by the user terminal or the information processing system. The avatar motion control method may be initiated by the user terminal or the processor of the information processing system receiving input audio, at S510.

After that, the processor may determine whether or not music is detected in the input audio, at S520. In an example embodiment, the processor may analyze the input audio and determine whether or not music is included in the input audio based on feature information (e.g., duration of sound and/or pitch between notes) extracted therefrom. After that, the processor may determine whether or not a speech of the user is detected in the input audio, at S530 and S560.

When both music and speech are detected in the input audio, the processor may control the lip motion of the user avatar through speech recognition at S540, and control the body motion of the user avatar based on the melody code detected from the input audio, at S550. When music is detected, but no speech is detected in the input audio, the processor may control the body motion of the user avatar based on the melody code detected from the input audio, at S550. In this case, the processor may control the playback speed of the body motion of the avatar applied to the avatar based on the tempo of music detected from the input audio.

When no music is detected, but a speech is detected in the input audio, the processor may perform speech recognition to control the lip motion of the user avatar at S570, control the body motion of the user avatar based on the instructions at S580, and control the facial expression of the user avatar based on the speech tone detected from the input audio at S590. As illustrated, the processor may perform the avatar motion control in real time while continuously receiving the input audio.

Although FIG. 5 illustrates that the controlling the lip motion of the user avatar at S570 is performed prior to the controlling the body motion of the user avatar at S580 and to the controlling the facial expression of the user avatar at S590, the present disclosure is not limited thereto. For example, the controlling the lip motion of the user avatar at S570, the controlling the body motion of the user avatar at S580, and the controlling the facial expression of the user avatar at S590 may be performed in parallel, or respective steps may be sequentially performed in any order.

Figure 6:
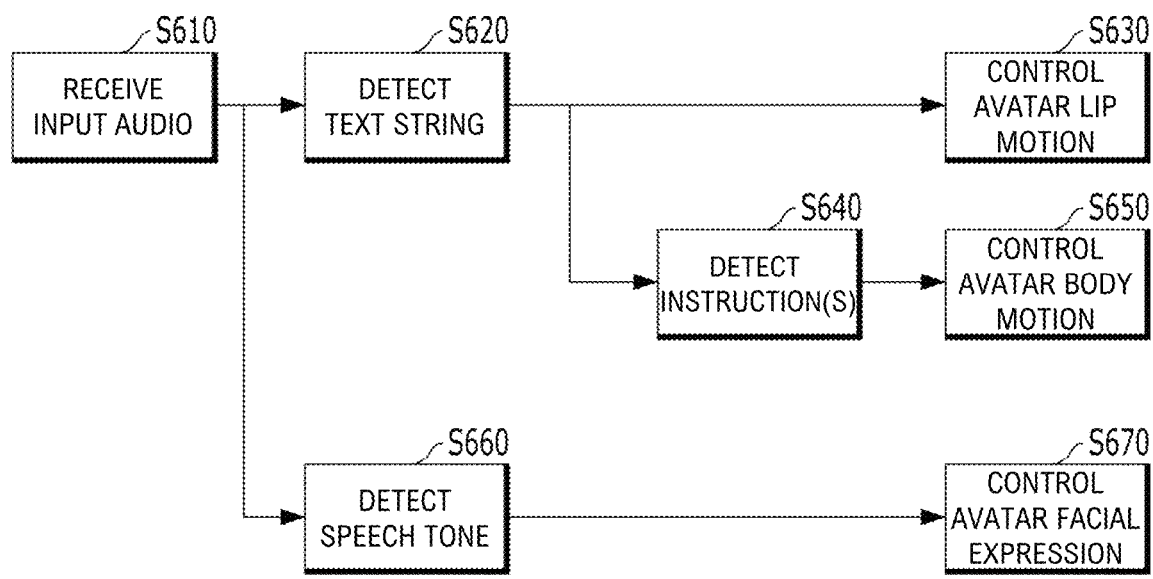
FIG. 6 is a flowchart illustrating an example of a method for controlling avatar motion based on speech according to an example embodiment.

FIG. 6 is a flowchart illustrating an example of a method for controlling avatar motion based on speech according to an example embodiment. The method for controlling avatar motion based on speech may be performed by the user terminal or the information processing system. The method for controlling avatar motion based on speech may be initiated by the user terminal or the processor of the information processing system receiving input audio, at S610.

The processor may detect a text string from the input audio through speech recognition, at S620. After that, the processor may control the lip motion of the avatar based on the detected text string, at S630. According to an example embodiment, the processor may control the lip motion of the user avatar to become a shape of a mouth for pronouncing the detected text string.

Further, the processor may analyze the detected text string and detect instructions included in the text string, at S640. According to an example embodiment, the processor may calculate or determine the degree of similarity between the detected text string and pre-stored instructions, and detect an instruction associated with the detected text string based on the calculated degree of similarity (e.g., similarity score). For example, when the detected text string is "Today was a depressing day", the processor determines that "depress" in the detected text string has the highest similarity score, which is equal to or greater than a threshold value, with "sadness" among pre-stored instructions and, and detect "sadness" as the instruction associated with the detected text string.

After that, the processor may control the body motion of the avatar by applying the avatar motion associated with the detected instruction to the user avatar by using a mapping table in which the instructions and the avatar motions are mapped, at S650. For example, when the instruction "sadness" is associated with a crying motion of the avatar, the processor may control the body motion of the avatar such that the avatar makes a crying motion in response to the detection of the instruction "sadness".

It is described above that the processor detects an instruction associated with the detected text string and retrieves the avatar motion associated with the detected associated instruction by using the mapping table, but the order of the detecting operation is not limited thereto. According to an example embodiment, the processor may analyze the detected text string to detect the instruction included in the text string at S640, and check whether or not the detected instruction is included in a mapping table in which the instructions and the avatar motions are mapped. The processor may check whether or not the instruction detected at S640 is the instruction associated with the avatar motion in the mapping table. Subsequently, when it is determined that the instruction detected at S640 is not present in the mapping table, the processor may detect an instruction most similar to the instruction detected at S640 among the instructions present in the mapping table. At this time, in order to detect the similar instruction, for example, Word2Vec algorithm may be used. For example, when the detected text string is "Today was a depressing day", the processor may determine that "depress" in the detected text string is not present in the mapping table, and use the Word2Vec algorithm to detect that the instruction "sadness" is most similar to "depressed" among the instructions present in the mapping table. After that, the processor may control the body motion of the avatar by applying the crying motion of the avatar associated with the instruction "sadness" detected by using the mapping table to the user avatar.

Meanwhile, the processor may detect a speech tone from the received input audio, at S660. According to an example embodiment, the processor may detect a speech tone associated with the user's emotion by analyzing the audio spectrum of the input audio. For example, the processor may detect a speech tone associated with "sadness" by analyzing the speech spectrum of "Today was a depressing day" spoken by the user.

Then, the processor may control the facial expression of the avatar based on the detected speech tone, at S670. In an example embodiment, the processor may search for an avatar facial expression associated with the detected speech tone by using a mapping table in which the speech tones and the avatar facial expressions are mapped. For example, when the speech tone associated with "sadness" is detected from the input audio, the processor may apply the avatar facial expression associated with the speech tone in the mapping table to the user avatar.

As illustrated, the detecting the speech tone at S660 may be performed in parallel with the detecting the text string at S620. The controlling the avatar lip motion at S630, the controlling the avatar body motion at S650, and the controlling the avatar facial expression at S670 may also be performed in parallel.

Figure 7:
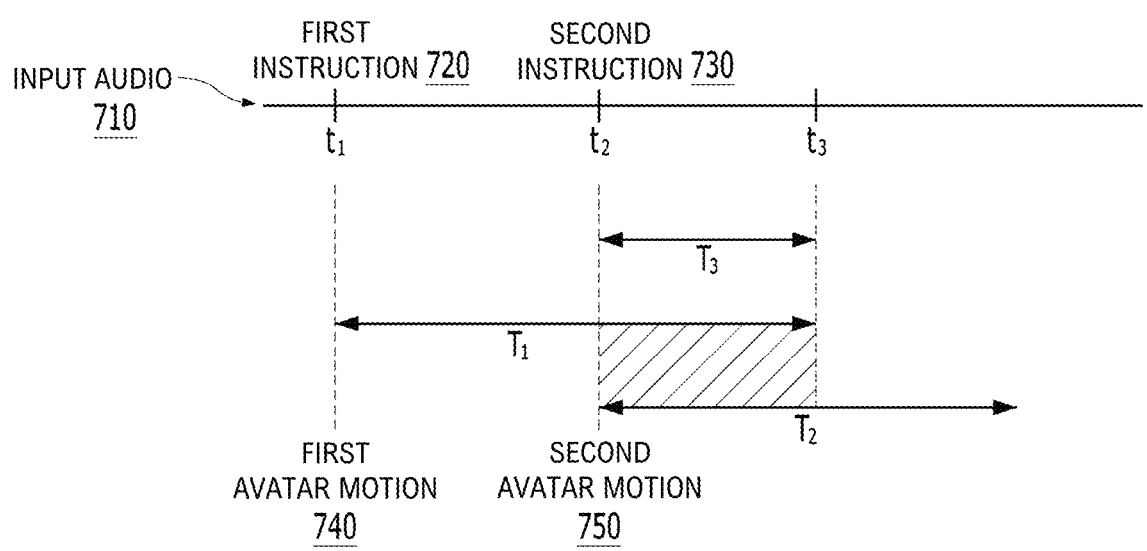
FIG. 7 is a diagram illustrating an example of application to a plurality of avatar motions according to an example embodiment.

FIG. 7 is a diagram illustrating an example of application to a plurality of avatar motions according to an example embodiment. As described above, according to an example embodiment, the processor may control the body motion of the avatar by searching for the avatar motion associated with the text string detected from the input audio 710 by using a mapping table in which instruction and avatar motions are mapped, and applying the searched avatar motion to the user avatar. In this case, the processor may detect the text string from the input audio 710 through speech recognition, search for the instruction most similar to the detected text string based on determining similarity between the detected text string and the instruction registered in the mapping table, and find the avatar motion associated with the searched instruction.

As illustrated, the processor may determine that a similarity score between the text string detected at a first time point $t_1$ of the input audio 710 and a first instruction 720 registered in the mapping table is the highest score and is equal to or greater than the threshold value. In this case, the processor may determine that the first instruction 720 is detected at the first time point $t_1$ and apply the first avatar motion 740 associated with the first instruction 720 in the mapping table to the user avatar. In an example embodiment, the mapping table may store the playback time for each avatar motion. For example, the playback time of the first avatar motion 740 may be stored as $T_1$, and the playback time of the second avatar motion 750 may be stored as $T_2$.

Further, the processor may determine that the similarity score between the text string detected at the second time point $t_2$ of the input audio 710 and the second instruction 730 registered in the mapping table is the highest and is equal to or greater than the threshold value. In this case, the processor may determine that the second instruction 730 is detected at the second time point $t_2$. As illustrated, the second instruction 730 may be associated with the second avatar motion 750 in the mapping table.

When the second instruction 730 is detected before the playback of the first avatar motion 740 is completed, the processor may determine whether the first avatar motion 740 and the second avatar motion 750 associated with the second instruction 730 are applicable in an overlapping manner. When it is determined that the first avatar motion 740 and the second avatar motion 750 are applicable in the overlapping manner, the processor may apply the first avatar motion 740 and the second avatar motion 750 to the user avatar in the overlapping manner. For example, when the first avatar motion 740 is the "Hooray" motion and the second avatar motion 750 is a "Jump" motion, the processor may determine that the "Hooray" motion and the "Jump" motion are applicable in the overlapping manner, and apply the "Hooray" motion to the user avatar for the period of time $T_1$ from the first time point $t_1$, and apply the "Jump" motion to the user avatar for the period of time $T_2$ from the second time point $t_2$. In this case, from the second time point $t_2$ to the third time point $t_3$, that is, during a period of time $T_3$, the "Hooray" motion and the "Jump" motion are applied to the user avatar in the overlapping manner such that the upper body of the user can make a hooray pose while the lower body is jumping.

On the other hand, when it is determined that the first avatar motion 740 and the second avatar motion 750 are not applicable in the overlapping manner, the processor may delay the timing of applying the second avatar motion 750 such that the second avatar motion 750 is applied to the user avatar after the application of the first avatar motion 740 is finished. For example, when the first avatar motion 740 is the "Hooray" motion and the second avatar motion 750 is a "Dance" motion, the processor may determine that the "Hooray" motion and the "Dance" motion are not applicable in the overlapping manner, and apply the "Hooray" motion to the user avatar from the first time point $t_1$ to the third time point $t_3$, and delay the timing of applying the "Dance" motion by $T_3$ and thus apply the "Dance" motion to the user avatar from the third time point $t_3$.

According to another example embodiment, when it is determined that the first avatar motion 740 and the second avatar motion 750 are not applicable in the overlapping manner, the processor may shorten the playback time of the first avatar motion 740. For example, when the first avatar motion 740 is the "Hooray" motion and the second avatar motion 750 is the "Dance" motion, the processor may determine that the "Hooray" motion and the "Jump" motion are not applicable in the overlapping manner, and thus shorten the playback time of the "Hooray" motion by $T_3$ and thus apply the "Hooray" motion to the user avatar only until the second time point $t_2$, and then apply the "Dance" motion to the user avatar from the second time point $t_2$.

When it is determined that the first avatar motion 740 and the second avatar motion 750 are not applicable in the overlapping manner, the processor may stop the first avatar motion 740 and insert a third avatar motion for smoothly transitioning from the first avatar motion 740 to the second avatar motion 750 before applying the second avatar motion 750. For example, when the first avatar motion 740 is a "Hooray" motion and the second avatar motion 750 is an "Attention" motion, the processor may determine that the "Hooray" motion and the "Attention" motion are not applicable in the overlapping manner. At this time, after stopping the first avatar motion 740 at the second time point $t_2$ and before starting the "Attention" motion as the second avatar motion 750 at the third time point $t_3$, that is, for a period of time $T_3$, a motion of the avatar's arms gradually let downward may be inserted in order to smoothly transition from the "Hooray" motion to the "Attention" motion.

As described above, a more natural user avatar motion can be provided by adjusting the point of applying the avatar motion according to whether or not a plurality of avatar motions to be applied to the user avatar are applicable in the overlapping manner.

Figure 8:
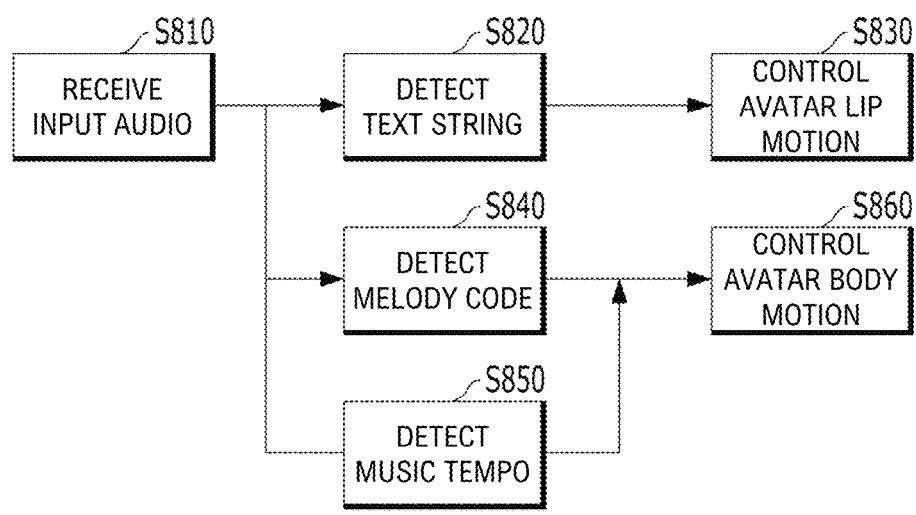
FIG. 8 is a flowchart illustrating an example of a method for controlling avatar motion based on music according to an example embodiment.

FIG. 8 is a flowchart illustrating an example of a method for controlling avatar motion based on music according to an example embodiment. The method for controlling avatar motion based on music may be performed by the user terminal or the information processing system. The method for controlling avatar motion based on music may be initiated by the user terminal or the processor of the information processing system receiving input audio, at S810.

The processor may detect a text string from the input audio through speech recognition, at S820. After that, the processor may control the lip motion of the avatar based on the detected text string, at S830. According to an example embodiment, the processor may control the lip motion of the user avatar to become a shape of a mouth for pronouncing the detected text string.

In addition, the processor may detect a melody code from the input audio at S840 and detect the tempo of music from the input audio at S850. After that, the processor may control the body motion of the avatar by applying the avatar motion associated with the detected melody code to the user avatar by using a mapping table in which the melody codes and the avatar motions are mapped, at S860. In this case, the processor may determine the playback speed of the avatar motion based on the detected tempo of the music, and playback the avatar motion in accordance with the tempo of the music.

As illustrated, the detecting the tempo of the music at S850 may be performed in parallel with the detecting the text string at S820 and the detecting the melody code at S840. The controlling the avatar lip motion at S830 and the controlling the avatar body motion at S860 may also be performed in parallel.

Figure 9:
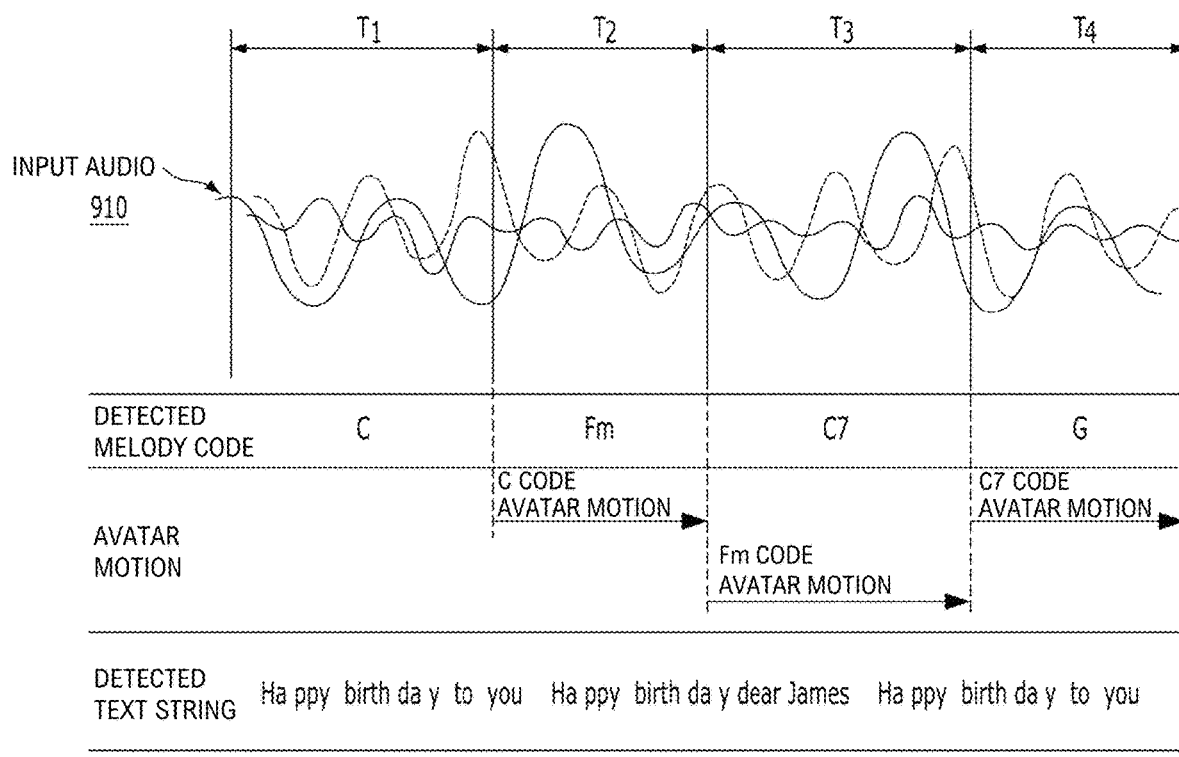
FIG. 9 is a diagram illustrating an example of a music-based avatar motion control according to an example embodiment.

FIG. 9 is a diagram illustrating an example of a music-based avatar motion control according to an example embodiment. As illustrated, the processor may detect a melody code C in section $T_1$ of the input audio 910, a melody code Fm in section $T_2$, a melody code C7 in section $T_3$, and a melody code G in section $T_4$. In this case, the processor may search for an avatar motion corresponding to the detected melody codes and apply the searched avatar motion to the user avatar.

According to an example embodiment, when the melody code of section $T_1$ is detected as the C code, the processor may apply the avatar motion associated with the C code to the user avatar until the next code (Fm) is detected. Similarly, when the melody code of section $T_2$ is detected as the Fm code, the avatar motion associated with the Fm code may be applied to the user avatar until the next code (C7) is detected, and when the melody code of section $T_3$ is detected as C7, the avatar motion associated with the C7 code may be applied to the user avatar until the next code (G) is detected. In this case, the playback speed of the avatar motion associated with the detected melody code may be determined by the tempo of the song detected by the processor.

Further, the processor may detect a text string (e.g., lyrics) from the input audio 910 through speech recognition. As illustrated, when a text string of "Happy birthday to you Happy birthday dear James happy birthday to you" is detected from the input audio 910, the processor may control the lip motion of the user avatar in real time such that the shape of a mouth of the user avatar becomes same as the shape of a mouth of pronouncing the corresponding text string.

Figure 10:
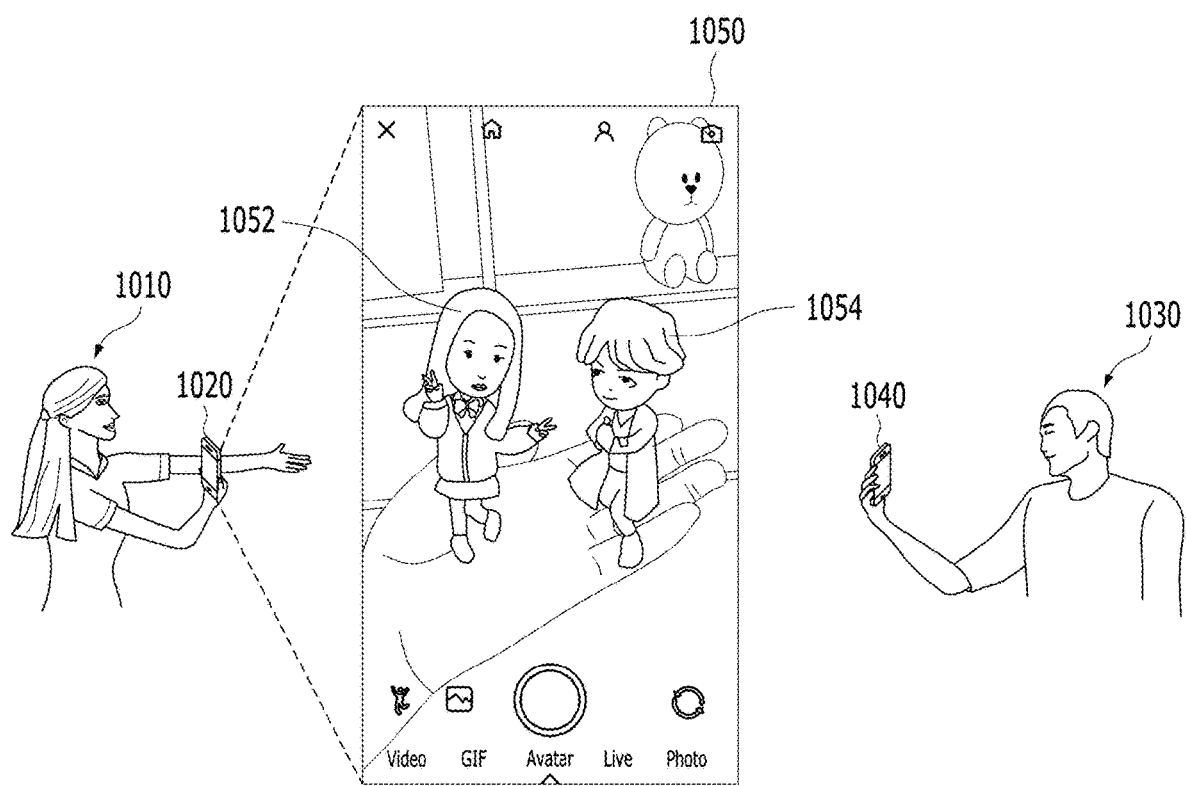
FIG. 10 is a diagram illustrating an example of displaying and controlling both a first avatar and a second avatar together in a first user terminal according to an example embodiment.

FIG. 10 is a diagram illustrating an example of displaying and controlling a first avatar 1052 and a second avatar 1054 together in a first user terminal 1020 according to an example embodiment. In an example embodiment, the first user 1010 may use the avatar motion control service by displaying his or her avatar 1052 together with an avatar 1054 of another user nearby. To this end, the first user 1010 may search for another user terminal located in a vicinity of the first user terminal 1020 through short-range communication, or the like, and select the second user terminal 1040 from among the searched other user terminals.

In this case, the first user terminal 1020 may transmit a request to participate in an event to the second user terminal 1040. The request to participate in an event may be a request made to obtain permission from the second user 1030 to use the avatar of the second user 1030. In an example embodiment, a request to join may be transmitted through short-range communication or may be transmitted through an instant messaging service. The second user 1030 receiving the request to participate in an event may accept the request to participate in an event by using the second user terminal 1040.

In response to the second user 1030 accepting the request to participate in an event, the first user terminal 1020 may display the first user avatar 1052 and the second user avatar 1054 together on a camera application screen 1050. In an example embodiment, the first user terminal 1020 may receive information on the second user avatar 1054 from the second user terminal 1040 through the short-range communication or from a server through the instant messaging application. For example, the screen 1050 may be a screen of an in-app camera of the instant messaging application, and the first user avatar 1052 and the second user avatar 1054 may be avatars used by the first user 1010 and the second user 1030 in the instant messaging application, respectively. In this case, the first user terminal 1020 may display the first user avatar 1052 and the second user avatar 1054 on an input video received by the image sensor. Accordingly, the first user 1010, together with the second user 1030, may use an augmented reality (AR) service using avatars.

In an example embodiment, the motion of the first user avatar 1052 is controlled based on the input audio received by the first user terminal 1020, and the motion of the second user avatar 1054 may be controlled based on the input audio received by the second user terminal 1040. In this case, the second user terminal 1040 may transmit the received input audio to the first user terminal 1020, and the first user terminal 1020 may control the motion of the second user avatar 1054 based on the input audio received from the second user terminal 1040. In some example embodiments, the second user terminal 1040 may perform processing (e.g., speech recognition, speech tone analysis, melody code detection, music tempo detection, and/or song recognition) of the received input audio, and then and transmit the processed data to the first user terminal 1020, and the first user terminal 1020 may control the motion of the second user avatar 1054 based on the processed data received from the second user terminal 1040.

In another example embodiment, the first user terminal 1020 may distinguish between the speech of the first user 1010 and the speech of the second user 1030 from the input audio received through the audio sensor, and control the motion of the first user avatar 1052 based on the speech of the first user 1010 and control the motion of the second user avatar 1054 based on the speech of the second user 1020. The speech of the first user 1010 and the speech of the second user 1030 may be distinguished by a difference in speech according to gender, a difference in speech size according to distance, a difference in speech characteristics, and the like.

As described above, even when the motion of the first user avatar 1052 and the motion of the second user avatar 1054 are separately controlled, when a specific keyword (e.g., group motion keyword) is detected, the first user avatar 1052 and the second user avatar 1054 may be controlled to perform the group motion. For example, when the first user 1010 says "high five" with an exciting voice, the first user terminal 1020 may control the body motion of the first user avatar 1052 and the body motion of the second user avatar 1054 together such that the first user avatar 1052 and the second user avatar 1054 perform the high-five motion. Further, the first user terminal 1020 may control the lip motions of the avatars 1052 and 1054 such that the avatars have a shape of a mouth for pronouncing "high five", and control the facial expressions of the avatars such that the avatars make exciting facial expressions.

In another example embodiment, the motions of the first user avatar 1052 and the second user avatar 1054 may be controlled together based on the input audio received from the first user terminal 1020.

In an example embodiment, the first user terminal 1020 may be configured to display an additional graphic element on the screen while controlling the motion of the first user avatar 1052 and/or the avatar of another user nearby (e.g., the second user avatar 1054) based on the sound. In this case, the first user terminal 1020 may determine a target to apply the avatar motion and graphic elements. In an example embodiment, the first user terminal 1020 may determine a target to apply the avatar motion and graphic elements, based on speaker information, a user name or nickname detected by speech recognition, and the like.

For example, when the user name or nickname of the second user 1030 is "James", and the first user 1010 says "Happy Birthday to James" with an exciting voice, the first user terminal 1020 may determine that "birthday" in the detected text string is associated with an avatar motion (e.g., clapping motion) and a graphic element (e.g., a birthday hat, a speech balloon such as "Today Birthday", and/or a filter effect) previously stored. In this case, the first user terminal 1020 may control the body motion of the first user avatar 1052 such that the first user avatar 1052, which is the speaker, performs the clapping motion, and may put a birthday hat on the second user avatar 1054. Additionally, the first user terminal 1020 may display a speech balloon such that the detected text string is displayed on the first user avatar 1054. In some example embodiments, the first user terminal 1020 may display on the screen a filter effect associated with the detected keyword.

According to some example embodiments, because an apparatus including one or more processors may receive an input audio and extract avatar-motion control information from the input audio through speech recognition, and the apparatus may automatically control a motion of a user avatar based on the extracted avatar-motion control information in real-time. Further, the apparatus may search for the motion of a user avatar associated with the detected text string by using a mapping table, in which instructions and avatar motions are mapped and based on a similarity between the detected text string and the instructions registered in the mapping table. Thus, such an apparatus may control a motion of user avatar in real-time, with relatively less computation, meaning consuming less computing resources and thus consuming less power.

The method for controlling user motion described above may be implemented as a computer-readable code stored on a computer-readable recording medium. The computer-readable recording medium includes all kinds of recording devices in which data readable by a computer system is stored. Examples of computer-readable recording medium include ROM, RAM, CD-ROM, magnetic tape, floppy disks, and optical data storage devices, and the like. In addition, the computer-readable recording medium may be distributed over network coupled computer systems so that the computer-readable code is stored and executed in a distributed manner. Further, programmers in the technical field pertinent to the present disclosure will be easily able to envision functional programs, codes and code segments to implement the example embodiments.

The methods, operations, or techniques of this disclosure may be implemented by various means. For example, these techniques may be implemented in hardware, firmware, software, or a combination thereof. Those skilled in the art will further appreciate that the various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any conventional processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transfer of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that can be used to transfer or store desired program code in the form of instructions or data structures and can be accessed by a computer. Also, any connection is properly referred to as a computer-readable medium.

For example, when the software is transmitted from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in, RAM memory, flash memory, ROM memory, EPROM memory, EEPROM memory, registers, hard disk, removable disk, CD-ROM, or any other form of storage medium known. An example storage medium may be connected to the processor, such that the processor may read or write information from or to the storage medium. In some example embodiments, the storage medium may be integrated into the processor. The processor and the storage medium may exist in the ASIC. The ASIC may exist in the user terminal. Alternatively, the processor and storage medium may exist as separate components in the user terminal.

Although the example embodiments described above have been described as utilizing aspects of the currently disclosed subject matter in one or more standalone computer systems, the present disclosure is not limited thereto, and may be implemented in conjunction with any computing environment, such as a network or distributed computing environment. Furthermore, aspects of the subject matter in this disclosure may be implemented in multiple processing chips or devices, and storage may be similarly influenced across a plurality of devices. Such devices may include PCs, network servers, and portable devices.

Although the present disclosure has been described in connection with some example embodiments herein, various modifications and changes can be made without departing from the scope of the present disclosure, which can be understood by those skilled in the art to which the present disclosure pertains. Further, such modifications and changes are intended to fall within the scope of the claims appended herein.

What is claimed is:

1. A method for controlling avatar motion, performed by a first user terminal including one or more processors, the method comprising:
   receiving input audio by an audio sensor;
   detecting, by the one or more processors, a first text string at a first time point of the input audio and a second text string at a second time point of the input audio, the second time point following the first time point:
   determining, by the one or more processors, a first instruction registered in a first mapping table, in which instructions and corresponding avatar motions are mapped to each other, based on a similarity score between the first text string and the first instruction;
   determining, by the one or more processors, a second instruction registered in the first mapping table based on a similarity score between the second text string and second first instruction; and
   controlling, by the one or more processors, a motion of a first user avatar based on the input audio, the controlling including applying a first avatar motion associated with the first instruction and a second avatar motion associated with the second instruction in an overlapping manner, in response to determining that the first avatar motion and the second avatar motion to be applied to the first user avatar are applicable in an overlapping manner, and adjusting a point of stopping a first avatar motion and a point of applying a second avatar motion, in response to determining that the first avatar motion and the second avatar motion to be applied to the first user avatar are not applicable in the overlapping manner.

2. The method according to claim 1, wherein the detecting includes:
detecting the first text string and the second text string from the input audio through speech recognition.

3. The method according to claim 2, wherein the adjusting includes:
in response to determining that the first avatar motion and the second avatar motion are not applicable in the overlapping manner, delaying a timing of applying the second avatar motion such that the second avatar motion is applied to the first user avatar after application of the first avatar motion is finished.

4. The method according to claim 2, wherein the adjusting includes:
in response to determining that the first avatar motion and the second avatar motion are not applicable in the overlapping manner, shortening a playback time of the first avatar motion.

5. The method according to claim 2, wherein the controlling a motion of a first user avatar further includes controlling a lip motion of the first user avatar based on the detected first text string.

6. The method according to claim 5, wherein the controlling a motion of a first user avatar further includes controlling a facial expression of the first user avatar based on a speech tone detected from the input audio.

7. The method according to claim 1, wherein the controlling further includes controlling a body motion of the first user avatar based on at least one of a tempo or a melody code of music detected from the input audio.

8. The method according to claim 7, wherein the controlling a body motion of the first user avatar includes:
searching for a specific avatar motion associated with the detected melody code by using a second mapping table, in which melody codes and avatar motions are mapped to each other;
determining a playback speed of the searched specific avatar motion based on the detected tempo of the music; and
applying the searched specific avatar motion to the first user avatar.

9. The method according to claim 7, wherein the controlling a motion of a first user avatar further includes:
detecting a text string from the input audio through speech recognition; and
controlling a shape of a mouth of the first user avatar based on the detected text string.

10. The method according to claim 1, further comprising:
displaying a second user avatar associated with another user terminal and the first user avatar together on a screen,
wherein a motion of the second user avatar is controlled based on another input audio received by the another user terminal.

11. The method according to claim 10, wherein the controlling further includes:
detecting a text string from the input audio through speech recognition;
searching for a specific avatar motion from the detected text string by using the first mapping table; and
in response to the searched specific avatar motion being determined as a group motion, applying the searched avatar motion to the first user avatar and the second user avatar.

12. The method according to claim 1, further comprising:
searching for another user terminal in a vicinity of a first user terminal through short-range communication;
transmitting a request to participate in an event to the another user terminal; and
in response to the another user terminal accepting the request to participate in the event, displaying the first user avatar and a second user avatar associated with the another user terminal together on a screen of the first user terminal.

13. The method according to claim 12, further comprising:
receiving an input video by an image sensor; and
displaying the first user avatar and the second user avatar on the input video.

14. The method according to claim 12, further comprising:
controlling the motion of the first user avatar and a motion of the second user avatar together based on the input audio received by the audio sensor.

15. The method according to claim 12, further comprising:
controlling a motion of the second user avatar based on the input audio received by the another user terminal.

16. The method according to claim 1, wherein the controlling further includes:
analyzing the input audio to recognize a song; and
applying a choreography associated with the recognized song to the first user avatar.

17. A non-transitory computer-readable recording medium storing instructions for execution by one or more processors that, when executed by the one or more processors, cause an apparatus including the one or more processors to perform the method according to claim 1.

18. An apparatus for controlling avatar motion, comprising:
a memory; and
one or more processors connected to the memory and configured to execute computer-readable instructions contained in the memory such that the one or more processors are configured to cause the apparatus to,
receive an input audio from an audio sensor,
detect a first text string at a first time point of the input audio and a second text string at a second time point of the input audio, the second time point following the first time point,
determine a first instruction registered in a first mapping table, in which instructions and corresponding avatar motions are mapped to each other, based on a similarity score between the first text string and the first instruction having a highest value and being equal to or greater than a threshold value,
determine a second instruction registered in the first mapping table based on a similarity score between the second text string and the second first instruction having a highest value and being equal to or greater than a threshold value, and control a motion of a first user avatar based on the input audio by applying a first avatar motion associated with the first instruction and a second avatar motion associated with the second instruction in an overlapping manner, in response to determining that the first avatar motion and the second avatar motion to be applied to the first avatar are applicable in an overlapping manner, and adjusting a point of stopping a first avatar motion and a point of applying a second avatar motion, in response to determining that the first avatar motion and the second avatar motion to be applied to the first user avatar are not applicable in the overlapping manner.

\* \* \* \* \*